(12) United States Patent
Jiang et al.

(10) Patent No.: US 11,955,143 B2
(45) Date of Patent: Apr. 9, 2024

(54) AUTOMATIC VIDEO EDITING METHOD AND PORTABLE TERMINAL

(71) Applicant: ARASHI VISION INC., Guangdong (CN)

(72) Inventors: Wenjie Jiang, Shenzhen (CN); Jinlin Cai, Shenzhen (CN); Jingkang Liu, Shenzhen (CN)

(73) Assignee: ARASHI VISION INC., Guangdong (CN)

(*) Notice: Subject to any disclaimer, the term of this patent is extended or adjusted under 35 U.S.C. 154(b) by 135 days.

(21) Appl. No.: 17/432,411

(22) PCT Filed: Apr. 22, 2020

(86) PCT No.: PCT/CN2020/086188
§ 371 (c)(1),
(2) Date: Aug. 19, 2021

(87) PCT Pub. No.: WO2020/169121
PCT Pub. Date: Aug. 27, 2020

(65) Prior Publication Data
US 2022/0199121 A1    Jun. 23, 2022

(30) Foreign Application Priority Data
Feb. 22, 2019    (CN) .......................... 201910132043.8

(51) Int. Cl.
*G11B 27/036*    (2006.01)
*G06V 10/98*     (2022.01)
(Continued)

(52) U.S. Cl.
CPC .......... *G11B 27/036* (2013.01); *G06V 10/993* (2022.01); *G06V 20/41* (2022.01);
(Continued)

(58) Field of Classification Search
CPC ...... G11B 27/036; G11B 27/34; G06V 20/49; G06V 20/46; G06V 20/41; G06V 10/993; G06V 2201/07
See application file for complete search history.

(56) References Cited

U.S. PATENT DOCUMENTS

| 2009/0083790 A1 | 3/2009 | Wang et al. |
| 2009/0100050 A1* | 4/2009 | Erol ...................... G06F 18/254 |
| | | 707/999.005 |

(Continued)

FOREIGN PATENT DOCUMENTS

| CN | 101464893 A | 6/2009 |
| CN | 101599179 A | 12/2009 |

(Continued)

OTHER PUBLICATIONS

Fang Li et al., "non-official translation: Development of Video for Patent Abstract Technology", China Science and Technology Information, No. 23, Dec. 31, 2018, w/English Abstract, (3 pages).

(Continued)

*Primary Examiner* — Sunghyoun Park
(74) *Attorney, Agent, or Firm* — Polsinelli PC

(57) ABSTRACT

Provided are an automatic video editing method and a portable terminal, the method comprising: obtaining a video to be edited; extracting key frames of the video to be edited; inputting the key frames to a pre-trained scene classification method and a pre-trained target detection method, and respectively obtaining scene type markers and target object markers of the key frames; selecting multiple video segments from the video to be edited which satisfy preset editing criteria; respectively calculating average scores of the multiple video segments by means of a pre-trained image (Continued)

quality scoring method; respectively obtaining the video segment having the highest average score of each shot type for splicing.

16 Claims, 2 Drawing Sheets

(51) Int. Cl.
  *G06V 20/40* (2022.01)
  *G11B 27/34* (2006.01)
(52) U.S. Cl.
  CPC .............. *G06V 20/46* (2022.01); *G06V 20/49* (2022.01); *G11B 27/34* (2013.01); *G06V 2201/07* (2022.01)

(56) References Cited

U.S. PATENT DOCUMENTS

| | | | | |
|---|---|---|---|---|
| 2010/0104261 | A1* | 4/2010 | Liu | H04N 5/147 348/576 |
| 2012/0230588 | A1* | 9/2012 | Nakate | G11B 27/105 382/190 |
| 2017/0256288 | A1* | 9/2017 | Ai | H04N 5/2628 |
| 2017/0372749 | A1 | 12/2017 | Ramaswamy et al. | |
| 2018/0040349 | A1* | 2/2018 | Xie | G11B 27/036 |
| 2020/0051252 | A1* | 2/2020 | Brown | G06F 18/214 |
| 2020/0242381 | A1* | 7/2020 | Chao | G06V 20/597 |
| 2021/0133623 | A1* | 5/2021 | Amrani | G06F 18/23 |

FOREIGN PATENT DOCUMENTS

| | | |
|---|---|---|
| CN | 101807198 A | 8/2010 |
| CN | 102819528 A | 12/2012 |
| CN | 103210651 A | 7/2013 |
| CN | 104978364 A | 10/2015 |
| CN | 107222795 A | 9/2017 |
| CN | 107223344 A | 9/2017 |
| CN | 107566907 A | 1/2018 |
| CN | 109819338 A | 5/2019 |
| EP | 1182584 A2 | 2/2002 |
| JP | 2002-084488 A | 3/2002 |
| JP | 2005323276 A | 11/2005 |
| JP | 2012010265 A | 1/2012 |
| WO | 2000040011 A1 | 7/2000 |
| WO | 2010006334 A1 | 1/2010 |

OTHER PUBLICATIONS

International Search Report dated Jul. 21, 2020 issued in corresponding Parent Application No. PCT/CN2020/086188 (6 pages).
Chinese Office Action dated Apr. 1, 2021 issued in corresponding Patent Application No. 201910132043.8 (3 pages).
Chinese Office Action dated Aug. 10, 2020 issued in corresponding Patent Application No. 201910132043.8 (8 pages).
European Search Report issued in corresponding EP Application No. 20759825.1, dated Sep. 23, 2022.
Japanese Office Action issued in corresponding JP Application No. 21005928, dated Sep. 20, 2022.

* cited by examiner

AUTOMATIC VIDEO EDITING METHOD AND PORTABLE TERMINAL

CROSS REFERENCE TO RELATED APPLICATION

The present application is a National Phase of International Application No. PCT/CN2020/086188, filed on Apr. 22, 2020 which claims priority to Chinese Patent Application No. 201910132043.8, filed on Feb. 22, 2019 and entitled "Automatic Video Editing Method and Portable terminal", and the content of which is herein incorporated by reference in their entireties.

TECHNICAL FIELD

The present disclosure relates to the field of videos, and particularly to an automatic video editing method and a portable terminal.

BACKGROUND

With the development of multimedia technology, various images, audios and videos add a lot of fun to people's lives. When people watch video files such as movies, TV shows, or short films they shoot, they usually choose the clips they are interested in to watch, but it is difficult to find these clips accurately, especially for users who are accustomed to using mobile terminals to watch videos; accordingly, it is very inconvenient to watch because the users basically use fingers to perform the related operations on the progress bar on the touch screen.

The manual methods are mostly adopted for the traditional video editing, that is, each video to be edited is manually previewed, the highlights of a game are determined and edited by himself. This method not only makes video editing inefficient, but also has low accuracy of video editing due to errors in the human operations.

SUMMARY

Technical Problem

The present disclosure provides an automatic video editing method, a computer-readable storage medium and a portable terminal, which aim to avoid the problems of low editing efficiency and low accuracy caused by human factors, and achieve an effect of automatic video editing.

Technical Solution

In the first aspect, the present disclosure provides an automatic video editing method, including:
  acquiring a video to be edited;
  extracting a key frame of the video to be edited;
  inputting the key frame into a pre-trained scene categorization method and a pre-trained target detection method to respectively obtain a marker of a scene type and a marker of a target object;
  screening out a plurality of video segments meeting a preset editing rule from the video to be edited;
  respectively calculating an average score of the plurality of video segments through a pre-trained image quality scoring method;
  acquiring and stitching video segments with a highest average score corresponding to each lens type.

In the second aspect, the present disclosure provides a computer-readable storage medium, on which a computer program is stored, the computer program, when executed by a processor, implements the steps of the automatic video editing method as provided in the first aspect.

In the third aspect, the present disclosure provides a portable terminal, including:
  one or more processors;
  a memory; and
  one or more computer programs, wherein the one or more computer programs are stored in the memory and configured to be executed by the one or more processors, the processors, when executing the computer programs, implement the steps of the automatic video editing method as provided in the first aspect.

Advantages

In the present disclosure, through the pre-trained scene categorization method and the image quality scoring method, the editing rule and procedures are generated, and an effect of automatic video editing is implemented. The technical solution of the present disclosure can avoid the problems of low editing efficiency and low accuracy caused by human factors, and improve the efficiency of video editing.

DETAILED DESCRIPTION

In order to make the objectives, technical solution, and advantages of the present disclosure clearer, the present disclosure will be described in detail with reference to the accompanying drawings and embodiments. It should be appreciated that the specific embodiments described here are only used for explaining the present disclosure, rather than limiting the present disclosure.

In order to illustrate the technical solution of the present disclosure, specific embodiments are used for description below.

Embodiment I

Figure 1:
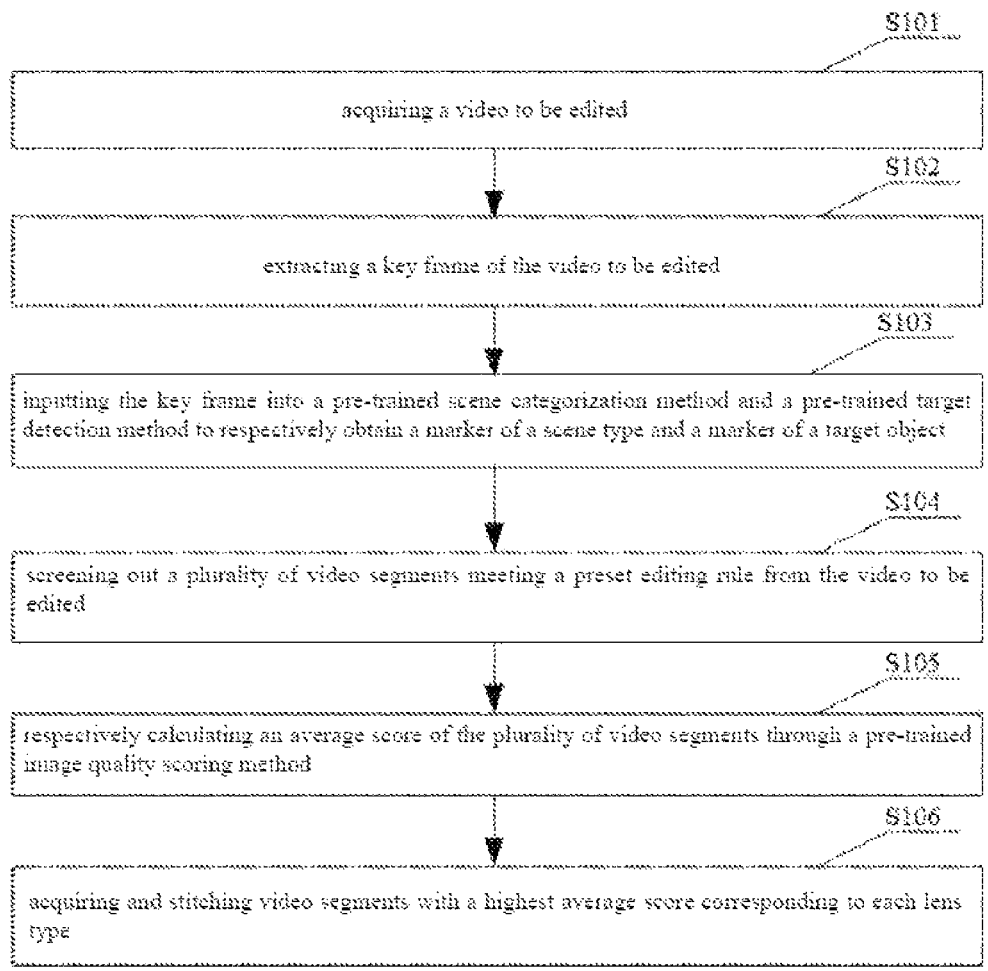
FIG. 1 is a flow chart showing an automatic video editing method according to an embodiment I of the present disclosure.

Referring to FIG. 1, an automatic video editing method provided by the embodiment I of the present disclosure includes the following steps.

S101: a video to be edited is acquired.

The number of videos to be edited is n, and n≥5.

It should be noted that the video to be edited in the embodiments of this disclosure can be a video file such as a movie, a TV series, or a short film shot by the user, or can also be a video file of other types or sources or a video file of a common format, such as mp4, insv, etc., which is not limited herein.

S102: a key frame of the video to be edited is extracted.

The key frame of the video to be edited can be extracted, but not limited to, by using a third-party library "ffmpeg".

It should be noted that the key frame describes information of an image background and a moving subject. By reading the key frame image data, the image content of the video can be acquired. The packaging format of the video file is marked with a key frame list, such as a video in mp4 format. A "stss box" indicates information of the key frame list, which contains a video moment of each key frame and an address deviation of a video file. By reading the "stss box" information, an image of each key frame of the video to be edited can be acquired.

S103: for the key frame, a pre-trained scene categorization method and a pre-trained target detection method are adopted to extract a marker of a scene type and a marker of a target object respectively.

In the pre-trained scene categorization method, there are p scene types, which include but are not limited to streets, offices, subway stations, airport, shops, beaches, etc. The p corresponds to a sequence of the preset scene types, with p≥100. The i-th key frame is inputted into the pre-trained scene categorization method to determine the scene type of the key frame, the marker of the scene type is obtained and is denoted as $S_i$, with $S_i \in [0,p]$.

There are k preset target objects, which can include but are not limited to people, vehicles, food, balls, electronic equipment, animals and plants, etc. The k corresponds to a sequence of the preset target objects, and k≥50. The i-th key frame is inputted into the pre-trained target detection method to detect the target object in the key frame, and the marker $D_i$ of the target object is obtained, with $D_i \in [0, k]$.

It should be noted that the pre-trained scene classification method is a pre-trained scene categorization algorithm based on a deep convolutional network, which can determine the scene type of the image. The pre-trained target detection method is a pre-trained target detection algorithm based on the deep convolutional network, which can detect whether there exists a preset target object in the image.

S104: multiple video segments meeting a preset editing rule are screened out from the videos to be edited.

The preset editing rule includes preset lens types and the number of key frames of a video segment to be edited corresponding to each lens type.

The preset lens type in the preset editing rule is determined by a combination of the scene type and the target object, that is, one preset lens type is determined by one preset scene type and one or more target objects. The preset lens type can include but is not limited to work, travel, shopping, scenery, sports and other daily life scenes. For example, the scene type corresponding to a preset lens type of work can be an office or a conference room, and/or the target object can be a computer, a desk, a keyboard and/or a mouse, etc.

Figure 2:
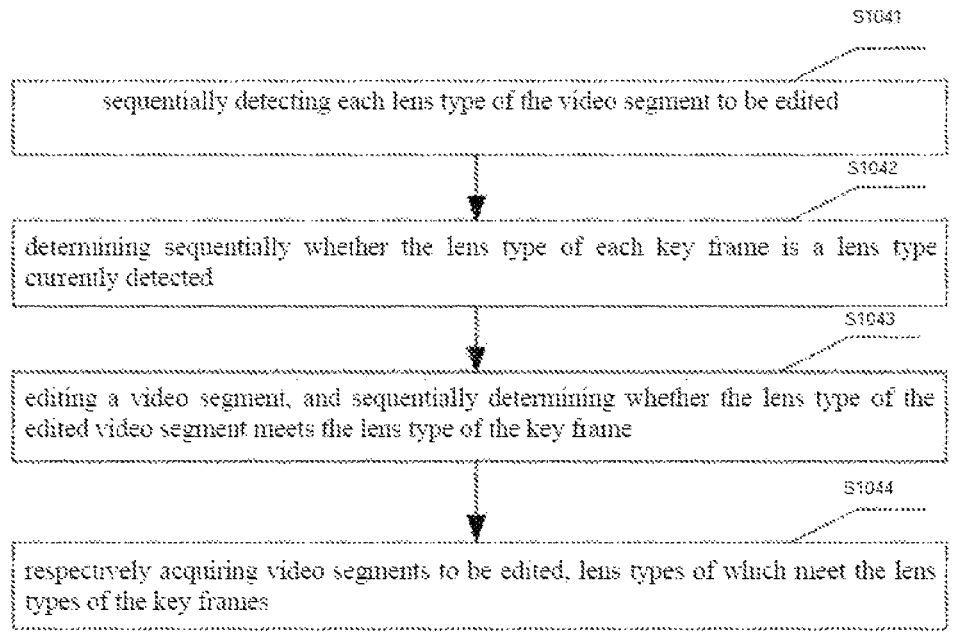
FIG. 2 is a flow chart of screening video segments that meet a preset editing rule according to the embodiment I of the present disclosure.

Referring to FIG. 2, the step of screening out the video segments meeting the preset editing rule includes the following steps.

S1041: each lens type of the video segment to be edited is detected sequentially.

The number of preset lens types in the preset editing rule is equal to j, and j≥3.

S1042: it is determined sequentially whether the lens type of each key frame is a lens type currently detected.

A function $f_j(i)$ is adopted to sequentially determine whether the lens type of the i-th key frame is the j-th lens type:

$$f_j(i) = \begin{cases} 1 & \text{if } S_i \in SSet_j \mid D_i \in DSet_j \\ 0 & \text{else} \end{cases} \quad (1)$$

In the formula (1), $SSet_j$ and $DSet_j$ are respectively a set of scene types and a set of target objects for the j-th preset lens type in the preset editing rule; and $S_i$ and $D_i$ are respectively the scene type and the target object of the i-th key frame obtained in the step S103. When $f_j(i)=1$, it is indicated that the lens type of the i-th key frame is the currently detected lens type; when $f_j(i)=0$, it is indicated that the lens type of the i-th key frame is not the currently detected lens type.

S1043: a video segment is edited, and it is sequentially determined whether the lens type of the edited video segment meets the lens type of the key frame.

In the preset editing rule, the number of consecutive key frames of the video segment to be edited corresponding to each lens type is preset to t, and t≥3; it is determined whether the edited video segment meets the currently detected lens type of the key frame through a function $m_j(i,t)$:

$$m_j(i, t) = \begin{cases} 1 & \text{if } f_j(i) \cdot f_j(i+1) \cdots f_j(i+t-1) = 1 \\ 0 & \text{else} \end{cases} \quad (2)$$

In the formula (2), $m_j(i,t)=1$ indicates that the lens type of the edited video segment meets the currently detected lens type of the key frame; and $m_j(i,t)=0$ indicates that the lens type of the edited video segment does not meet the currently detected lens type of the key frame.

S1044: video segments to be edited, lens types of which meet the currently detected lens types of the key frames, are respectively acquired.

When the j-th lens type is detected, the video segments corresponding to the i-th key frame are recorded as $mask_j(i,t)$; $mask_j(i,t)$ represents video segments between beginning time of displaying the i-th key frame in the video and beginning time of displaying the (i+t)-key frame in the video.

S105: an average score of the multiple video segments is calculated through a pre-trained image quality scoring method.

The step of calculating the average score of the multiple video segments that meet the preset editing rule specifically includes:

a formula for calculating the average score $M_j(i,t)$ of the video segments $mask_j(i,t)$ is:

$$M_j(i, t) = \frac{l_i + l_{i+1} + \cdots + l_{i+t-1}}{t} \quad (3)$$

In the formula (3), $l_i$ is an image quality score obtained by inputting the i-th key frame into the pre-trained image quality scoring method; and $l_{i+t-1}$ is an image quality score obtained by inputting the (i+t−1)-th key frame into the pre-trained image quality scoring method, t is the number of consecutive key frames of the video segments $mask_j(i,t)$.

It should be noted that the pre-trained image quality scoring method is a pre-trained image quality scoring algorithm based on the deep convolutional network, which can output a corresponding score l for the quality of the inputted image, with l∈(0, 1); and the greater the value l, the better the image quality.

S106: video segments with a highest average score corresponding to each lens type are respectively acquired and stitched.

The step of acquiring and stitching the video segments with the highest average score corresponding to each lens type to generate a new video file specifically includes following steps.

When the j-th lens type is detected, the video segments max($M_j(i)$) with the highest average score corresponding to the lens type are acquired, and finally j video segments can be acquired; and the j video segments are stitched according to a preset sequence of scenes to generate a new video file.

After the stitching is completed, a preset background music can be added. There may be multiple preset background music. The background music includes but is not limited to ordinary music and audio files.

In the present disclosure, through the pre-trained scene categorization method and the image quality scoring method, the editing rule and procedures are generated, and an effect of automatic video editing is achieved. The technical scheme of the present disclosure can avoid the problems of low editing efficiency and low accuracy caused by human factors, and improve the efficiency of video editing.

Embodiment II

The second embodiment of the present disclosure provides a computer-readable storage medium which stores a computer program, and the computer program, when executed by a processor, performs the steps of the automatic video editing method as provided in the embodiment I of the present disclosure. The computer-readable storage medium can be a non-transitory computer-readable storage medium.

Embodiment III

Figure 3:
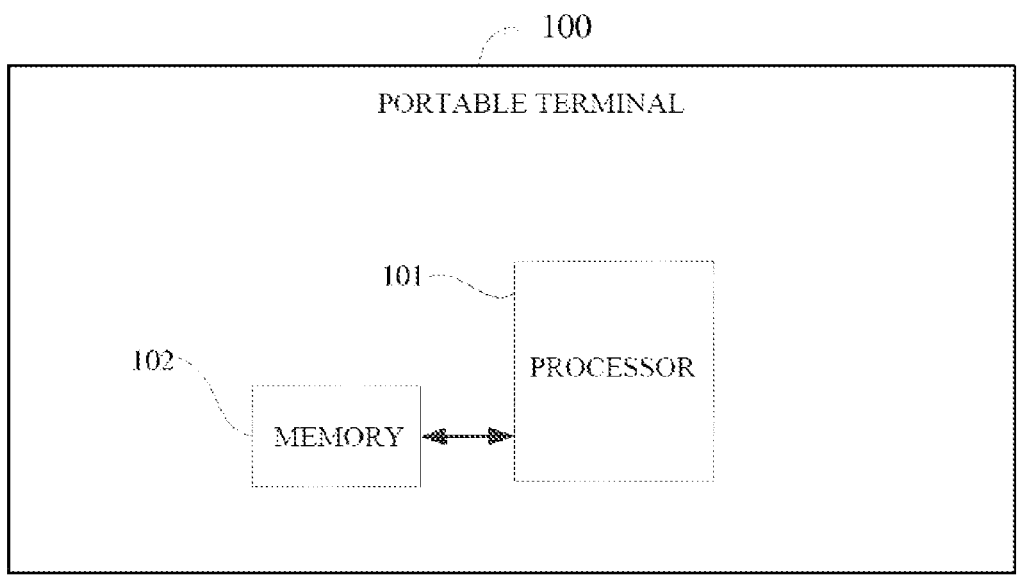
FIG. 3 is a schematic structure diagram of a portable terminal according to an embodiment III of the present disclosure.

FIG. 3 shows a specific structure block diagram of a portable terminal provided in embodiment III of the present disclosure. The portable terminal 100 includes: one or more processors 101, a memory 102, and one or more computer programs; the processor 101 is connected to the memory 102 by a bus; the one or more computer programs are stored in the memory 102, and are configured to be executed by the one or more processors 101; and the processor 101, when executing the computer programs, implements the steps of the automatic video editing method provided in the embodiment I of the present disclosure.

In the embodiments of the present disclosure, those of ordinary skill in the art can understand that all or part of the steps in the methods of the above-mentioned embodiments can be implemented by a program instructing relevant hardware, and the program can be stored in a computer-readable storage medium. The storage medium mentioned is, such as ROM/RAM, a magnetic disk, an optical disk, etc.

The above are merely the preferred embodiments of the present disclosure and are not intended to limit the present disclosure. Any modification, equivalent replacement and improvement made within the spirit and principle of the present disclosure shall be regarded as the protection scope of the present disclosure.

What is claimed is:

1. An automatic video editing method, comprising:
acquiring a video to be edited;
extracting a key frame of the video to be edited;
inputting the key frame into a pre-trained scene categorization method and a pre-trained target detection method to respectively obtain a marker of a scene type and a marker of a target object;
screening out a plurality of video segments meeting a preset editing rule from the video to be edited;
respectively calculating an average score of the plurality of video segments through a pre-trained image quality scoring method;
acquiring and stitching video segments with a highest average score corresponding to each lens type;
wherein the inputting the key frame into a pre-trained scene categorization method and a pre-trained target detection method to respectively obtain a marker of a scene type and a marker of a target object comprises:
there being p scene types in the pre-trained scene categorization method, p corresponding to a sequence of preset scene types, with p≥100, inputting the i-th key frame into the pre-trained scene categorization method to determine the scene type of the key frame, obtaining the marker $S_i$ of the scene type, with $S_i \in [0, p]$;
there being k preset target objects, k corresponding to a sequence of preset target objects, with k≥50, inputting the i-th key frame into the pre-trained target detection method to detect the target object in the key frame, and obtaining the marker $D_i$ of the target object, with $D_i \in [0, k]$.

2. The automatic video editing method according to claim 1, wherein a number of videos to be edited is equal to n, and n≥5.

3. The video automatic editing method according to claim 1, wherein the preset editing rule comprises a preset lens type and a number of key frames of a video segment to be edited corresponding to the preset lens type; the screening out the plurality of video segments meeting the preset editing rule from the video to be edited comprises:
detecting each lens type of the video segment to be edited sequentially, a number of preset lens types in the preset editing rule being j, with j≥3;
determining whether a lens type of the key frame is a currently detected lens type, wherein the determining whether a lens type of the key frame is a currently detected lens type comprising:
determining whether a lens type of the i-th key frame is the j-th lens type through a function $f_j(i)$, $$f_j(i) = \begin{cases} 1 & \text{if } S_i \in SSet_j \mid D_i \in DSet_j \\ 0 & \text{else} \end{cases} \quad (1)$$

wherein in the formula (1), $SSet_j$ and $DSet_j$ are respectively a set of scene types and a set of target objects for the j-th preset lens type in the preset editing rule, and $S_i$ and $D_i$ are respectively the scene type and the target object of the i-th key frame; when $f_j(i)=1$, the lends type of the i-th key frame is the currently detected lens type; when $f_j(i)=0$, the lends type of the i-th key frame is not the currently detected lens type;
determining whether the lens type of the video segment to be edited meets the currently detected lens type of the key frame, wherein the determining whether the lens type of the video segment to be edited meets the currently detected lens type of the key frame comprises: presetting a number of consecutive key frames of the video segment to be edited corresponding to each lens type to t, with t≥3, determining whether the edited video segment meets the currently detected lens type through a function $m_j(i,t)$, $$m_j(i, t) = \begin{cases} 1 & \text{if } f_j(i) \cdot f_j(i+1) \cdots f_j(i+t-1) = 1 \\ 0 & \text{else} \end{cases} \quad (2)$$

wherein, in the formula (2), $m_j(i,t)=1$ indicates that the lens type of the edited video segment meets the currently detected lens type, and $m_j(i,t)=0$ indicates that the lens type of the edited video segment does not meet the currently detected lens type;

acquiring video segments to be edited, lens types of which meeting the currently detected lens types of the key frames, wherein the acquiring video segments to be edited, lens types of which meeting the currently detected lens types of the key frames comprises: when detecting the j-th lens type, denoting video segments corresponding to the i-th key frame as $mask_j(i,t)$, $mask_j(i,t)$ representing video segments between beginning time of displaying the i-th key frame and beginning time of displaying the (i+t)-key frame in the video.

4. The automatic video editing method according to claim 1, wherein the respectively calculating the average score of each video segment through the pre-trained image quality scoring method comprises:

providing a formula for calculating the average score $M_j(i,t)$ of the video segments $mask_j(i,t)$ as:

$$M_j(i, t) = \frac{l_i + l_{i+1} + \cdots + l_{i+t-1}}{t} \quad (3)$$

wherein, in the formula (3), $l_i$ is an image quality score obtained by inputting the i-th key frame into the pre-trained image quality scoring method, and $I_{i+t-1}$ is an image quality score obtained by inputting the (i+t−1)-th key frame into the pre-trained image quality scoring method, t is a number of consecutive key frames of the video segments $mask_j(i,t)$.

5. The automatic video editing method according to claim 1, further comprising: adding preset background music after completing the stitching.

6. The automatic video editing method according to claim 1, further comprising: acquiring and stitching video segments with a highest average score corresponding to each lens type, wherein the lens type is determined by a combination of the scene type and the target object.

7. A portable terminal, comprising:
one or more processors;
a memory; and
one or more computer programs, wherein the one or more computer programs are stored in the memory and configured to be executed by the one or more processors, such that the processors, when executing the computer programs, perform operations comprising:
acquiring a video to be edited;
extracting a key frame of the video to be edited;
inputting the key frame into a pre-trained scene categorization method and a pre-trained target detection method to respectively obtain a marker of a scene type and a marker of a target object;
screening out a plurality of video segments meeting a preset editing rule from the video to be edited;
respectively calculating an average score of the plurality of video segments through a pre-trained image quality scoring method;
acquiring and stitching video segments with a highest average score corresponding to each lens type;
wherein the inputting the key frame into a pre-trained scene categorization method and a pre-trained target detection method to respectively obtain a marker of a scene type and a marker of a target object comprises:
there being p scene types in the pre-trained scene categorization method, p corresponding to a sequence of preset scene types, with p≥100, inputting the i-th key frame into the pre-trained scene categorization method to determine the scene type of the key frame, obtaining the marker $S_i$ of the scene type, with $S_i \in [0, p]$;
there being k preset target objects, k corresponding to a sequence of preset target objects, with k≥50, inputting the i-th key frame into the pre-trained target detection method to detect the target object in the key frame, and obtaining the marker $D_i$ of the target object, with $D_i \in [0, k]$.

8. The portable terminal according to claim 7, wherein the preset editing rule comprises a preset lens type and a number of key frames of a video segment to be edited corresponding to the preset lens type; the screening out the plurality of video segments meeting the preset editing rule from the video to be edited comprises:
detecting each lens type of the video segment to be edited sequentially, a number of preset lens types in the preset editing rule being j, with j≥3;
determining whether a lens type of the key frame is a currently detected lens type, wherein the determining whether a lens type of the key frame is a currently detected lens type comprising:
determining whether a lens type of the i-th key frame is the j-th lens type through a function $f_j(i)$, $$f_j(i) = \begin{cases} 1 & \text{if } S_i \in SSet_j \mid D_i \in DSet_j \\ 0 & \text{else} \end{cases} \quad (1)$$

wherein in the formula (1), $SSet_j$ and $DSet_j$ are respectively a set of scene types and a set of target objects for the j-th preset lens type in the preset editing rule, and $S_i$ and $D_i$ are respectively the scene type and the target object of the i-th key frame; when $f_j(i)=1$, the lends type of the i-th key frame is the currently detected lens type; when $f_j(i)=0$, the lends type of the i-th key frame is not the currently detected lens type;

determining whether the lens type of the video segment to be edited meets the currently detected lens type of the key frame, wherein the determining whether the lens type of the video segment to be edited meets the currently detected lens type comprises: presetting a number of consecutive key frames of the video segment to be edited corresponding to each lens type to t, with t≥3, determining whether the edited video segment meets the currently detected lens type through a function $m_j(i,t)$, $$m_j(i, t) = \begin{cases} 1 & \text{if } f_j(i) \cdot f_j(i+1) \cdots f_j(i+t-1) = 1 \\ 0 & \text{else} \end{cases} \quad (2)$$

wherein, in the formula (2), $m_j(i,t)=1$ indicates that the lens type of the edited video segment meets the currently detected lens type, and $m_j(i,t)=0$ indicates that the lens type of the edited video segment does not meet the currently detected lens type;

acquiring video segments to be edited, lens types of which meeting the currently detected lens type, wherein the acquiring video segments to be edited, lens types of which meeting the lens types of the key frames comprises: when detecting the j-th lens type, denoting video segments corresponding to the i-th key frame as $\text{mask}_j(i,t)$, $\text{mask}_j(i,t)$ representing video segments between beginning time of displaying the i-th key frame and beginning time of displaying the (i+t)-key frame in the video.

9. The portable terminal according to claim 7, wherein the respectively calculating the average score of each video segment through the pre-trained image quality scoring method comprises:

providing a formula for calculating the average score $M_j(i,t)$ of the video segments $\text{mask}_j(i,t)$ as:

$$M_j(i,t) = \frac{l_i + l_{i+1} + \cdots + l_{i+t-1}}{t} \quad (3)$$

wherein, in the formula (3), $l_i$ is an image quality score obtained by inputting the i-th key frame into the pre-trained image quality scoring method, and $l_{i+t-1}$ is an image quality score obtained by inputting the (i+t−1)-th key frame into the pre-trained image quality scoring method, t is a number of consecutive key frames of the video segments $\text{mask}_j(i,t)$.

10. The portable terminal according to claim 7, wherein the operation further comprise:
adding preset background music after completing the stitching.

11. The portable terminal according to claim 7, wherein the operations further comprise:
acquiring and stitching video segments with a highest average score corresponding to each lens type, wherein the lens type is determined by a combination of the scene type and the target object.

12. A non-transitory computer-readable storage medium, on which a computer program is stored, wherein, the computer program, when executed by a processor, causes the processor to perform operations, comprising:
acquiring a video to be edited;
extracting a key frame of the video to be edited;
inputting the key frame into a pre-trained scene categorization method and a pre-trained target detection method to respectively obtain a marker of a scene type and a marker of a target object;
screening out a plurality of video segments meeting a preset editing rule from the video to be edited;
respectively calculating an average score of the plurality of video segments through a pre-trained image quality scoring method;
acquiring and stitching video segments with a highest average score corresponding to each lens type;
wherein the inputting the key frame into a pre-trained scene categorization method and a pre-trained target detection method to respectively obtain a marker of a scene type and a marker of a target object comprises:
there being p scene types in the pre-trained scene categorization method, p corresponding to a sequence of preset scene types, with p≥100, inputting the i-th key frame into the pre-trained scene categorization method to determine the scene type of the key frame, obtaining the marker $S_i$ of the scene type, with $S_i \in [0, p]$;
there being k preset target objects, k corresponding to a sequence of preset target objects, with k≥50, inputting the i-th key frame into the pre-trained target detection method to detect the target object in the key frame, and obtaining the marker $D_i$ of the target object, with $D_i \in [0, k]$.

13. The non-transitory computer-readable storage medium according to claim 12, wherein the preset editing rule comprises a preset lens type and a number of key frames of a video segment to be edited corresponding to the preset lens type; the screening out the plurality of video segments meeting the preset editing rule from the video to be edited comprises:
detecting each lens type of the video segment to be edited sequentially, a number of preset lens types in the preset editing rule being j, with j≥3;
determining whether a lens type of the key frame is a currently detected lens type, wherein the determining whether a lens type of the key frame is a currently detected lens type comprising:
determining whether a lens type of the i-th key frame is the j-th lens type through a function $f_j(i)$, $$f_j(i) = \begin{cases} 1 & \text{if } S_i \in SSet_j \mid D_i \in DSet_j \\ 0 & \text{else} \end{cases} \quad (1)$$

wherein in the formula (1), $SSet_j$ and $DSet_j$ are respectively a set of scene types and a set of target objects for the j-th preset lens type in the preset editing rule, and $S_i$ and $D_i$ are respectively the scene type and the target object of the i-th key frame; when $f_j(i)=1$, the lends type of the i-th key frame is the currently detected lens type; when $f_j(i)=0$, the lends type of the i-th key frame is not the currently detected lens type;
determining whether the lens type of the video segment to be edited meets the currently detected lens type of the key frame, wherein the determining whether the lens type of the video segment to be edited meets the currently detected lens type comprises: presetting a number of consecutive key frames of the video segment to be edited corresponding to each lens type to t, with t≥3, determining whether the edited video segment meets the currently detected lens type through a function $m_j(i,t)$, $$m_j(i,t) = \begin{cases} 1 & \text{if } f_j(i) \cdot f_j(i+1) \cdots f_j(i+t-1) = 1 \\ 0 & \text{else} \end{cases} \quad (2)$$

wherein, in the formula (2), $m_j(i,t)=1$ indicates that the lens type of the edited video segment meets the currently detected lens type, and $m_j(i,t)=0$ indicates that the lens type of the edited video segment does not meet the currently detected lens type;

acquiring video segments to be edited, lens types of which meeting the currently detected lens type, wherein the acquiring video segments to be edited, lens types of which meeting the lens types of the key frames comprises: when detecting the j-th lens type, denoting video segments corresponding to the i-th key frame as $\text{mask}_j$ (i,t), mask$_j$(i,t) representing video segments between beginning time of displaying the i-th key frame and beginning time of displaying the (i+t)-key frame in the video.

14. The non-transitory computer-readable storage medium according to claim 12, wherein the respectively calculating the average score of each video segment through the pre-trained image quality scoring method comprises:

providing a formula for calculating the average score M$_j$(i,t) of the video segments mask$_j$(i,t) as:

$$M_j(i, t) = \frac{l_i + l_{i+1} + \cdots + l_{i+t-1}}{t} \quad (3)$$

wherein, in the formula (3), l$_i$ is an image quality score obtained by inputting the i-th key frame into the pre-trained image quality scoring method, and l$_{i+t-1}$ is an image quality score obtained by inputting the (i+t−1)-th key frame into the pre-trained image quality scoring method, t is a number of consecutive key frames of the video segments mask$_j$(i,t).

15. The non-transitory computer-readable storage medium according to claim 12, wherein the operation further comprise:

adding preset background music after completing the stitching.

16. The non-transitory computer-readable storage medium according to claim 12, wherein the operations further comprise:

acquiring and stitching video segments with a highest average score corresponding to each lens type, wherein the lens type is determined by a combination of the scene type and the target object.

\* \* \* \* \*